3,380,665
MULTI-STAGE MILLING
Harry C. Jester, Westfield, and Robert S. McNeil, Red Bank, N.J., assignors to National Lead Company, New York, N.Y., a corporation of New Jersey
No Drawing. Filed Apr. 16, 1965, Ser. No. 448,890
6 Claims. (Cl. 241—5)

ABSTRACT OF THE DISCLOSURE

The present invention relates to an improved method for effecting pulverization of solid pulverulent materials. More specifically the invention is concerned with a method for increasing the throughput of a fluid energy mill while simultaneously producing a pulverized material having improved physical properties; this is characterized by milling the pigment in successive stages, separating the spent milling fluid from the milled pulverulent material of a preceding milling stage and introducing the milled material from said preceding stage into the next succeeding milling stage with additional unspent milling fluid and regulating the milling intensity of each stage, in terms of the weight ratio of lbs. of milling fluid to lbs. of pigment, so that the sum of the milling intensities of all stages is no more than the milling intensity required to effect comparable milling in a single stage.

---

In general, fluid energy mills are designed to grind a solid pulverulent material to a predetermined size by the action of jets of gaseous fluid introduced at super-atmospheric pressure into a confined zone into which the pulverulent material is fed, the latter being entrained in the atmosphere of said gaseous fluid and recirculated by the action of said jets until reduced to the desired degree of fineness. Fluid energy mills of the type used to attain the objects of the present invention are sometimes referred to in the art, as jet mills or micronizers, the gaseous fluid used being generally superheated steam or compressed air. Due to the rotational effects resulting from the rapid circulation of the pulverulent material within the mill the material is subjected to a size reducing action the particles of material which have been milled to a predetermined size being continuously exhausted from the mill by entrainment in the gaseous fluid leaving the latter.

Comminution takes place to a considerable degree in such pulverizing operation, but it has now been discovered that the efficiency of this type of operation may be improved in accordance with the present invention not only to provide a much more effective rate of milling but simultaneously to effect improvements in the properties of the milled material.

An object therefore, of the present invention is to improve the throughput of a fluid energy mill used in the production of pulverized materials.

Another object of the invention is to provide a method for micronizing pigmentary $TiO_2$ so as to increase the throughput of the mill and simultaneously produce a milled $TiO_2$ material having superior pigmentary properties.

These and other objects, features and advantages of the invention will be described in more detail in the description which follows:

Broadly stated, the present invention relates to the discovery of a method for effecting a significant increase in the efficiency of a fluid energy mill and simultaneously produce a milled product by the rather simple, but unobvious expedient of lowering the weight ratio of the fluid milling medium to the material being milled and milling the material in two or more successive passes through a mill at equal milling intensities. That this method is unobvious and the results wholly unexpected will be appreciated by those skilled in the milling art wherein it has been generally thought that the improvements in milling efficiencies lay in the direction of higher milling intensities, in terms of higher ratios of milling medium to material being milled. Not only is the method of the present invention contrary to accepted practices in the milling art but, as will be shown in the examples below, the improvement in milling efficiency is also accompanied by a wholly unexpected improvement in the milled material.

With respect to the term "intensity of milling" as used herein and applied to a fluid energy mill of the micronizer type having a given steam pressure and a total steam flow, this may be defined as the ratio of the pounds of steam to the pounds of material being milled.

The pulverulent material used to illustrate the novel milling technique of the present invention is pigmentary $TiO_2$ which may be obtained from either of two sources i.e., the so-called sulfate process or the chloride process. A pigmentary $TiO_2$ derived from the sulfate process is a dried $TiO_2$ material produced by calcining a $TiO_2$ hydrate precipitated by hydrolysis from a clarified and concentrated solution of titanium sulfate in a manner well known in the art. The uncalcined $TiO_2$ hydrate may and usually does have a precalcination treatment with certain metal oxides, such as the oxides of potassium, phosphorus, antimony, etc. to impart certain desirable properties to the finished pigment. The treated $TiO_2$ hydrate is usually calcined at temperatures in the range of from 750–950° C. to develop optimum crystal structure and growth of the $TiO_2$ particles and is discharged from the calciner generally as a relatively coarse material i.e., aggregates consisting of discrete particles of $TiO_2$ having a particle size within the range of from 100 to 300 millimicrons. The aggregates are far too large for use as pigment in coating compositions, and the like, and hence the calciner discharge is milled, hydroseparated to produce $TiO_2$ fines, treated with hydrous metal oxides, and after coagulation, filtering and drying, given a final milling to achieve a particle size, and particle size distribution consistent with optimum pigmentary properties. These dried $TiO_2$ fines, prior to final milling are referred to in the art as drier discharge. A second source material used to illustrate the invention is a pyrogenic $TiO_2$ pigment produced by the so-called vapor phase or chloride process. Like the sulfate-base pigments, pyrogenic $TiO_2$ pigment is also treated with hydrous metal oxides including silica and the like, after which it is dried followed by a final milling; the dried pigment, prior to final milling, being also referred to as drier discharge.

The fluid energy mill used in practicing the method of this invention, is a conventional reentrant circulating type pulverizing mill, sometimes referred to in the art as a micronizer, typical of which is the mill shown in the Andrews Pat. No. 2,032,827. The material to be milled, which in this instance is $TiO_2$ drier discharge is fed from any suitable source of supply into the grinding chamber of the mill in which the material is made to circulate violently by high pressure streams of fluid discharging tangentially into the grinding chamber. In accordance with the physical laws of centrifugal force the coarse material is caused to circulate within the peripheral portion of the grinding chamber where it is brought continuously in contact with the high pressure jet streams which, in conjunction with the attrition of the material, serve to reduce the size of the particles. The finely divided material is withdrawn from the mill through a central orifice of the grinding chamber. Inasmuch as the construction and operation of this type of fluid energy mill are well known and amply exemplified in the art, such as in the aforesaid Andrews Pat. No. 2,032,827 no further description will be devoted thereto.

In carrying out the method of this invention a $TiO_2$ drier discharge consisting of $TiO_2$ fines is fed into a fluid energy mill, of the type described hereinabove, at a feed rate approaching the maximum amount of material which the mill injector is capable of handling such that the mill is operating at essentially its maximum throughput. In the embodiment of the invention described and illustrated in the following examples the feed rate of the $TiO_2$ drier discharge was about 1070 lbs./hr. for a micronizer having a standard steam flow rate of about 1600 lbs./hr. and a standard steam pressure of about 90 p.s.i.g. The milled discharge recovered from the first pass through the mill may be recycled to the same mill and again milled, the rate of feed of the milled discharge and the operation of the mill during the second pass being the same as in the first pass; or the milled discharge may be fed continuously from the first mill into a second mill in series and again milled under substantially identical conditions.

It is of the essence of the instant invention however, that the material is milled in a fluid energy mill in at least two successive milling steps or stages of substantially equal intensity; and in this respect the instant invention distinguishes over earlier milling techniques wherein a pigmentary material is milled in a single pass through the mill at relatively high milling intensities i.e., the ratio of pounds of steam to pounds of pigment being from 5:1 to as high as 10:1.

As practiced in this embodiment of the invention the milling intensity, as measured in terms of the ratio of lbs. of steam to lbs. of pigment is remarkably low for each pass, or stage, and as shown in the examples which follow is usually about 1.5:1. Thus for a two stage milling cycle, the total lbs. of steam per lb. of pigment is 3 while for a three step milling cycle the total lbs. of steam per lb. of pigment is 4.5, the weight ratio of the total amount of steam used to the total amount of pigment milled being an even multiple of the ratio of steam to pigment in each stage. It will be appreciated however that the ratio 1.5:1 is not in any sense critical to the success of the invention and it has been found that other ratios within the range of from 0.8 to 2.5:1 may be used advantageously depending upon the operating characteristics of the particular mill. Moreover even multiples of single stage millings within the aforesaid range are contemplated within the scope of the present invention such that the ratio of the total weight of steam to pigment may range from 1.6:1 to 5:1 for double stage milling to a high of from 2.4:1 to 7.5:1 for triple stage milling. It is significant that the steam to pigment ratios per stage are exceptionally low as compared to the steam to pigment ratios heretofore considered necessary for attaining optimum pigmentary properties. Among the more significant pigmentary properties are tinctorial strength, oil absorption and spectral characteristic.

The following comparative examples will serve, further, to illustrate the method of the invention and particularly the effect of multi-stage milling on the throughput of the mill as well as the improvement in pigmentary properties of the milled material.

In this connection the following tests were used to show the improvements in pigmentary properties achieved by the multi-stage milling technique of this invention.

TINCTORIAL STRENGTH $TiO_2$ pigment is dispersed in a vehicle and tinted with a black colorant. An opaque film of the tinted paint is drawn down on a card. The green reflectance value of the paint film as measured by a colorimeter (relative to the value of a standard pigment) is proportional to the tinctorial strength of the pigment. Higher tinctorial strength is developed by more severe milling.

OIL ABSORPTION

It is measured in terms of the weight in grams of linseed oil required to form a coherent mass with 100 grams of pigment. Lower oil absorption is developed by more severe milling.

SPECTRAL CHARACTERISTIC $TiO_2$ pigment is dispersed in a solvent-free vehicle containing a black colorant. The tinted paint is drawn down on a card. The blue reflectance value minus the red reflectance value of the paint film (relative to the value of a standard pigment) is the spectral characteristic. Higher spectral characteristic (less negative) is developed by more severe milling.

Example I

A first series of five runs was made using as source material titanium dioxide drier discharge, identified as Type-A obtained by milling rutile calciner discharge and applying a post calcination treatment with hydrous titania and alumina in accordance with well known techniques in the art. This drier discharge was fed into a fluid energy mill of the micronizer type operating at a steam flow rate of 1600 lbs./hr. and a steam pressure of 90 p.s.i.g. The rate of feed of the $TiO_2$ drier discharge to the mill was varied from 320 lbs./hr. to 1070 lbs./hr. to give steam to pigment ratios of from 5:1 to 1.5:1.

Separate portions of the $TiO_2$ drier discharge which had been milled once at the steam to pigment ratio of 1.5:1 were fed again to the mill operating at the same steam to pigment ratio, one portion for a second pass through the mill and a second portion for two additional passes through the mill.

The milled pigments were then tested for pigmentary properties using the testing methods described above. The results are shown in Table I below:

TABLE I.—PIGMENTARY PROPERTIES TYPE-A $TiO_2$ DRIER DISCHARGE

| Run No. | No. Stages | Steam/Pigment Per Stage | Steam/Pigment, Total | T.S. | O.A. | Spec. Char. |
|---|---|---|---|---|---|---|
| 1 | 1 | 5:1 | 5:1 | 1,788 | 21.6 | 2.8 |
| 2 | 1 | 3:1 | 3:1 | 1,780 | 22.0 | 2.8 |
| 3 | 1 | 1.5:1 | 1.5:1 | 1,743 | 22.3 | 2.6 |
| 4 | 2 | 1.5:1 | 3:1 | 1,797 | 20.9 | 2.9 |
| 5 | 3 | 1.5:1 | 4.5:1 | 1,822 | 20.4 | 3.2 |

The first three runs were single stage millings, the first being at a conventional milling intensity of 5:1 and the latter two at lesser intensities. It is evident that as the milling intensity per stage was reduced the tinctorial strength and spectral characteristic dropped and the oil absorption increased. The first three runs support the commonly accepted belief that pigmentary properties are improved by using progressively higher milling intensities, i.e. 5:1 steam to pigment ratio per stage.

However, runs four and five show clearly that a superior pigment is produced by the relatively low intensity multi-stage milling of this invention. Thus using two stages at 1.5:1 steam to pigment ratio per stage or a total steam to pigment ratio of 3:1 the tinctorial strength, spectral characteristic and oil absorption were superior to single stage milling at a steam to pigment ratio of 3:1 or even 5:1. A similar improvement was effected by three stage milling wherein the steam to pigment ratio was only 1.5 per stage or a total of 4.5:1 in three stages. Again the pigmentary characteristics of the milled pigment were superior to those of a product milled at higher intensities but in a single stage.

Example II

A second series of five runs was made using as source material titanium dioxide drier discharge, identified as Type-B, obtained by milling a rutile calciner discharge and applying a post calcination treatment with hydrous titania, silica and alumina. The operating conditions of the mill were the same as those described in Example I supra. The results obtained on the milled pigments are shown in Table II below:

TABLE II.—PIGMENTARY PROPERTIES TYPE-B TiO₂ DRIER DISCHARGE

| Run No. | No. Stages | Steam/Pigment Per Stage | Steam/Pigment, Total | T.S. | O.A. | Spec. Char. |
|---|---|---|---|---|---|---|
| 1 | 1 | 5:1 | 5:1 | 1,723 | 22.5 | 1.9 |
| 2 | 1 | 3:1 | 3:1 | 1,699 | 23.4 | 1.9 |
| 3 | 1 | 1.5:1 | 1.5:1 | 1,657 | 22.0 | 1.7 |
| 4 | 2 | 1.5:1 | 3:1 | 1,735 | 21.1 | 2.0 |
| 5 | 3 | 1.5:1 | 4.5:1 | 1,762 | 21.1 | 2.2 |

This series of runs using a Type-B TiO₂ drier discharge also supports the discovery that the use of multi-stage milling is not only more efficient than single stage high intensity milling but also produces a superior pigment.

Example III

The TiO₂ drier discharge used in the preceding examples was produced by the well known sulfate process. A second source of pigmentary TiO₂ is the pyrogenic TiO₂ produced by the so-called vapor phase or chloride process. Using a pyrogenic TiO₂ pigment, identified as pigment Type-C, which had been treated with hydrous titania and alumina, the dried pigment was milled in a series of four runs under conditions similar to those used in Example I. The properties of the milled pigment are shown in Table III below:

TABLE III.—PIGMENTARY PROPERTIES TYPE-C TiC₂ DRIER DISCHARGE

| Run No. | No. Stages | Steam/Pigment Per Stage | Steam/Pigment, Total | T.S. | O.A. | Spec. Char. |
|---|---|---|---|---|---|---|
| 1 | 1 | 5:1 | 5:1 | 1,797 | 20.0 | 2.8 |
| 2 | 1 | 1.5:1 | 1.5:1 | 1,750 | 21.8 | 2.6 |
| 3 | 2 | 1.5:1 | 3:1 | 1,812 | 19.1 | 2.9 |
| 4 | 3 | 1.5:1 | 4.5:1 | 1,833 | 18.5 | 3.2 |

The results tabulated above show that multistage, relatively low intensity milling of the drier discharge of a metal oxide treated pyrogenic TiO₂ pigment is more efficient and produces a superior product than conventional single stage milling.

Example IV

In each of the series of runs described in Examples I thru III the pigment was milled in a series of independent but successive steps. It has been found however, that similar improvements in pigmentary properties can be achieved in a continuous milling operation. Thus using two mills of the type described in Example I installed in series, TiO₂ drier discharge was fed continuously to the first mill, discharged from the first mill into a cyclone collector and fed from the latter into the second mill. The first stage and second stage mills each had a steam flow of 1600 lbs./hr. and a steam grinding jet pressure of 90 p.s.i.g. The pigment feed rate to the two mills was maintained at 800 lbs./hr. which gave a steam to pigment ratio (milling intensity) of 2:1 in each mill or a total steam to pigment ratio of 4:1. Using these conditions, the milling was replicated by using six batches of drier discharge, a portion of each of the six batches being given a conventional single stage milling at a steam to pigment ratio of 5:1 as a control. The pigmentary properties were averaged as indicated in Table IV below:

TABLE IV.—PIGMENTARY PROPERTIES TiO₂ DRIER DISCHARGE

| Run No. | No. Stages | Steam/Pigment Per Stage | Steam/Pigment, Total | T.S. | O.A. | Spec. Char. |
|---|---|---|---|---|---|---|
| 1-6 | 1 | 5:1 | 5:1 | 1,747 | 22.2 | 2.2 |
| 1-6 | 2 | 2:1 | 4:1 | 1,768 | 20.8 | 2.4 |

The above results again demonstrate that multi-stage relatively low intensity milling, in this instance on a continuous basis, is more effective than conventional high intensity single stage milling.

An analysis of the data set out in the tables above shows conclusively the surprisingly high efficiencies obtained by multiple stage milling as against single stage milling. A conventional single stage milling using a total of 5 lbs. of steam to 1 lb. of pigment produced a milled pigment having a tinctorial strength (T.S.) of 1788 (Example I) but when multiple stage milling was used, as in runs 4 and 5, pigments having higher tinctorial strengths i.e., 1797 and 1822 were obtained while the total amount of steam used per pound of pigment was considerably less than that used in the single stage milling operation. Similar results are shown in Examples II–IV. Thus multiple stage micronizing is considerably more efficient than single stage milling i.e., in some instances as low as about half as much steam is required to obtain a pigment of better quality than that obtained by conventional single stage high intensity milling techniques.

While the invention has been illustrated by specific reference to a TiO₂ drier discharge it has been found that the same unexpected increase in milling efficiencies obtain when materials other than TiO₂ drier discharge are used, as for example a TiO₂ calciner discharge, and the terms pulverulent solid materials, pigmentary material and similar terminology, as used herein, shall be interpreted broadly to include pigmentary materials other than TiO₂ drier discharge.

The invention may be carried out in other specific ways than those herein set forth without departing from the spirit and essential characteristics of the invention, and the present embodiments are, therefore, to be considered in all respects as illustrative and not restrictive and all changes coming within the meaning and equivalency range of the appended claims are intended to be embraced therein.

We claim:

1. In a process for milling a pulverulent material in a fluid energy mill at a predetermined milling intensity the improvement comprising; milling said pulverulent material in successive milling stages, separating the spent milling fluid from the milled pulverulent material of a preceding milling stage and introducing the milled material from said preceding stage into the next succeeding milling stage with additional unspent milling fluid, and regulating the intensity of milling in each stage such that the sum of the milling intensities of said successive stages is no more than said predetermined milling intensity.

2. In a process for milling a pulverulent material according to claim 1 wherein said pulverulent material is titanium dioxide and said predetermined milling intensity in terms of the weight ratio of lbs. of milling fluid to lbs. of pigment is in the range of from 1.5:1 to 8:1.

3. In a process for milling titanium dioxide according to claim 2 wherein the intensity of milling of each stage is equal to that of every other stage.

4. In a process for milling titanium dioxide according to claim 2 wherein the intensity of milling of each stage is in a weight ratio range of from 0.8:1 to 2.5:1.

5. In a process for milling titanium dioxide according to claim 2 wherein the number of successive stages is two and the intensity of milling of each stage is 1.5:1.

6. In a process for milling titanium dioxide according to claim 2 wherein the number of successive stages is three and the milling intensity of each stage is 1.5:1.

References Cited

UNITED STATES PATENTS 2,237,091  4/1941  Stephanoff _____ 241—5
3,178,121  4/1963  Wallace _____ 241—18

WILLIAM W. DYER, Jr., Primary Examiner.

R. J. ZLOTNIK, F. T. YOST, Assistant Examiners.